US008018440B2

(12) United States Patent
Townsend et al.

(10) Patent No.: US 8,018,440 B2
(45) Date of Patent: Sep. 13, 2011

(54) UNINTENTIONAL TOUCH REJECTION

(75) Inventors: Reed L. Townsend, Seattle, WA (US); Alexander J. Kolmykov-Zotov, Sammamish, WA (US); Steven P. Dodge, Sammamish, WA (US); Bryan D. Scott, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 850 days.

(21) Appl. No.: 11/324,157

(22) Filed: Dec. 30, 2005

(65) Prior Publication Data

US 2007/0152976 A1 Jul. 5, 2007

(51) Int. Cl.
*G06F 3/041* (2006.01)
(52) U.S. Cl. ...................................... 345/173; 340/407.1
(58) Field of Classification Search .......... 345/173–182; 715/700; 178/18.01
See application file for complete search history.

(56) References Cited

U.S. PATENT DOCUMENTS

| | | | |
|---|---|---|---|
| 4,868,912 A | | 9/1989 | Doering |
| 5,252,951 A | * | 10/1993 | Tannenbaum et al. ........ 345/173 |
| 5,404,458 A | | 4/1995 | Zetts |
| 5,496,974 A | * | 3/1996 | Akebi et al. ............... 178/18.05 |
| 5,777,596 A | | 7/1998 | Herbert |
| 5,943,052 A | | 8/1999 | Allen |
| 6,208,331 B1 | | 3/2001 | Singh |
| 6,246,395 B1 | | 6/2001 | Goyins |
| 6,266,050 B1 | * | 7/2001 | Oh et al. ....................... 345/173 |
| 6,459,424 B1 | | 10/2002 | Resman |
| 6,831,631 B2 | * | 12/2004 | Chuang ......................... 345/173 |
| 2005/0017957 A1 | * | 1/2005 | Yi ................................. 345/173 |
| 2006/0071912 A1 | * | 4/2006 | Hill et al. ....................... 345/173 |
| 2006/0109252 A1 | * | 5/2006 | Kolmykov-Zotov et al. . 345/173 |
| 2007/0146337 A1 | * | 6/2007 | Ording et al. ................. 345/173 |

OTHER PUBLICATIONS

Maxwell, Kenneth G., Writing drivers for common touch-screen interface hardware. Industrial Control Design Line, Jun. 15, 2005, [online],. [retrieved Nov. 28, 2005]. Retrieved from the Internet <URL: http://www.industrialcontroldesignline.com/howto/164900930>.
3M Touch Systems, Inc. Announces Shipment of Dispersive Signal Technology Product. Datasheet [online]. 3M Corporation, [retrieved Nov. 28, 2005]. Retrieved from the Internet <URL: http://www.3m.com/3mtouchsystems/Corporate/News/DST_090605.jhtml>.
AccuScribe Touchscreens. Datasheet [online]. Elo TouchSystem, [retrieved Nov. 28, 2005]. Retrieved from the Internet <URL: http://www.touchscreen.com.hk/scribe.htm>.
Touch Screen is available in .36-50.8 mm thickness. Datasheet [online]. ThomasNet Industrial News Room. [retrieved Nov. 28, 2005]. Retrieved from the Internet <URL: http://www.news.thomasnet.com.fullstory.24891>. In touch with new opportunities—Dispersive Signal Technology. Datasheet [online]. NXT [retrieved Nov. 28, 2005]. Retrieved from the Internet <URL: http://www.nxtsound.com/index.php?id=402>.

* cited by examiner

*Primary Examiner* — Kevin M Nguyen
*Assistant Examiner* — Kenneth B Lee, Jr.
(74) *Attorney, Agent, or Firm* — Lee & Hayes, PLLC

(57) ABSTRACT

A method for rejecting an unintentional palm touch is disclosed. In at least some embodiments, a touch is detected by a touch-sensitive surface associated with a display. Characteristics of the touch may be used to generate a set of parameters related to the touch. In an embodiment, firmware is used to determine a reliability value for the touch. The reliability value and the location of the touch is provided to a software module. The software module uses the reliability value and an activity context to determine a confidence level of the touch. In an embodiment, the confidence level may include an evaluation of changes in the reliability value over time. If the confidence level for the touch is too low, it may be rejected.

20 Claims, 11 Drawing Sheets

| Confidence of touch N | Parameter 1 | Parameter 2 | Reliability for particular touch R |
|---|---|---|---|
| C1 | P1-1 | P2-1 | R1 |
| C2 | P1-2 | P2-2 | R2 |
| C3 | P1-3 | P2-3 | R3 |
| C4 | P1-4 | P2-4 | R4 |
| C5 | P1-5 | P2-5 | R5 |

Fig. 10

UNINTENTIONAL TOUCH REJECTION

BACKGROUND

Touch-sensitive devices are becoming widespread in computing devices as a means of input, especially computing devices that are intended for portable use. Touch-sensitive devices are very convenient as they allow a user to make natural gestures familiar to the user in other contexts, such as by entering handwriting using a dedicated stylus in a manner similar to using a pen. While this provides a natural feel for the use, one potential problem with a dedicated stylus is that it can be lost. As can be appreciated, this is problematic if the dedicated stylus is required in order to electronically write or ink on the touch-sensitive device. Another potential problem is that it may be inconvenient to retrieve the stylus from its storage location when needed for only occasional use. Therefore, many of the computing devices include touch-sensitive surfaces that allow input to be provided by a variety of stylus types, including a user's fingertip. Accordingly, the term touch-sensitive surface or device will be used herein to refer to such surfaces or devices that are configured to detect the touch of any or all stylus types. While generally a convenient feature, a disadvantage to this ability to accept input from a variety of stylus types is that it is likely that the user will, from time to time, inadvertently touch the touch-sensitive surface with the user's finger, hand, etc., while writing on the device. This may also happen while the user is holding or otherwise handling the device. Users may find that these inadvertent touches perform undesired actions.

SUMMARY

In at least some embodiments an unintentional touch on a touch-sensitive device is automatically rejected. A touch is detected and a set of parameters related to the touch may be generated. The set of parameters may be used to determine a reliability value for the touch. The reliability value may be transmitted to a software module and the software module can determine a confidence level based on the reliability value and an activity context. The confidence level may include a determination of changes in the reliability over time.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present invention is illustrated by way of example and not limited in the accompanying figures in which like reference numerals indicate similar elements and in which:

FIG. 10 illustrates a depiction of data related to a series of touches that may be used in accordance with one or more aspects of the present invention.

DETAILED DESCRIPTION

Exemplary Computing Environment

Figure 1:
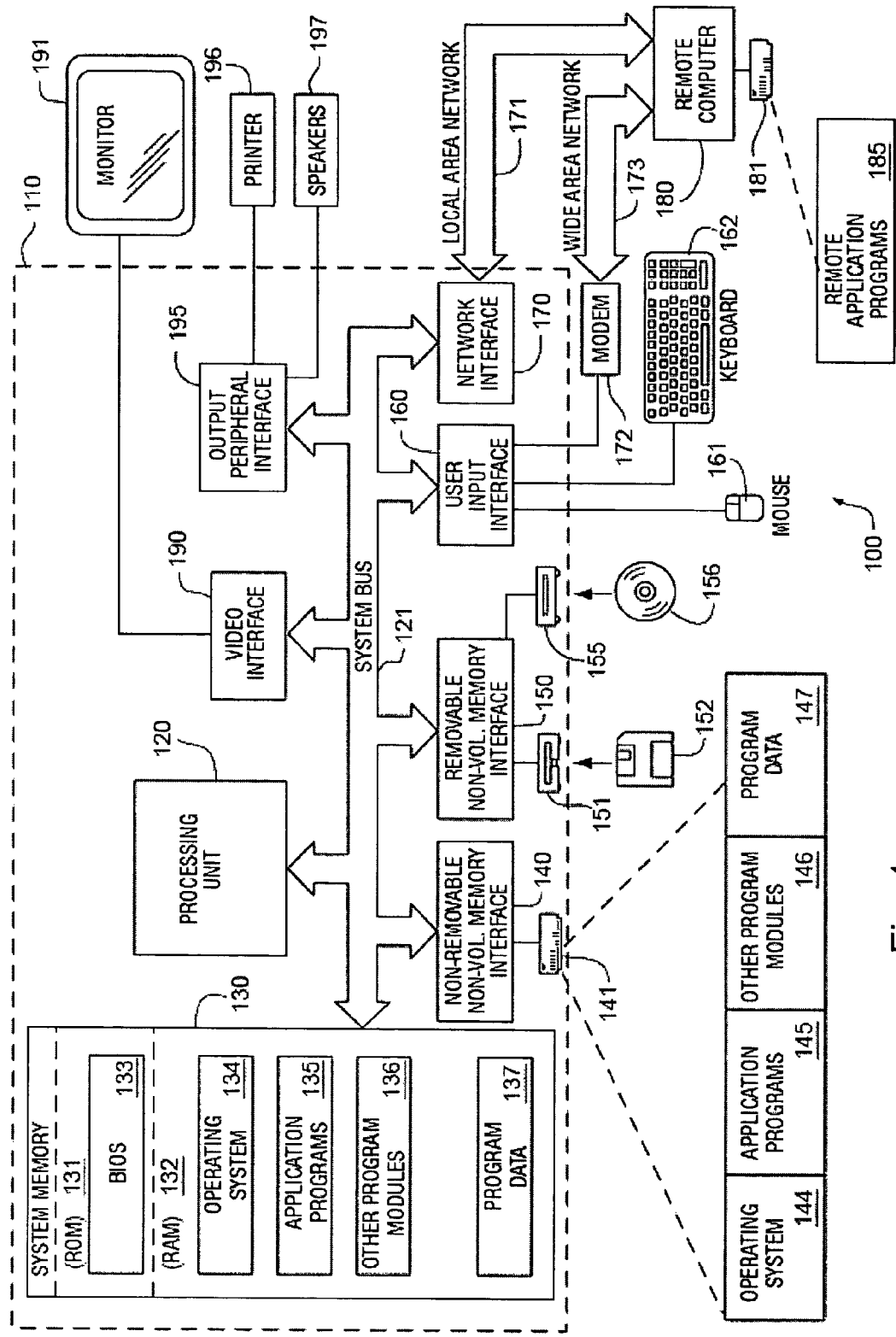
FIG. 1 illustrates a schematic diagram of an exemplary general-purpose digital computing environment in which certain aspects of the present invention may be implemented.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, and removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, and program modules and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
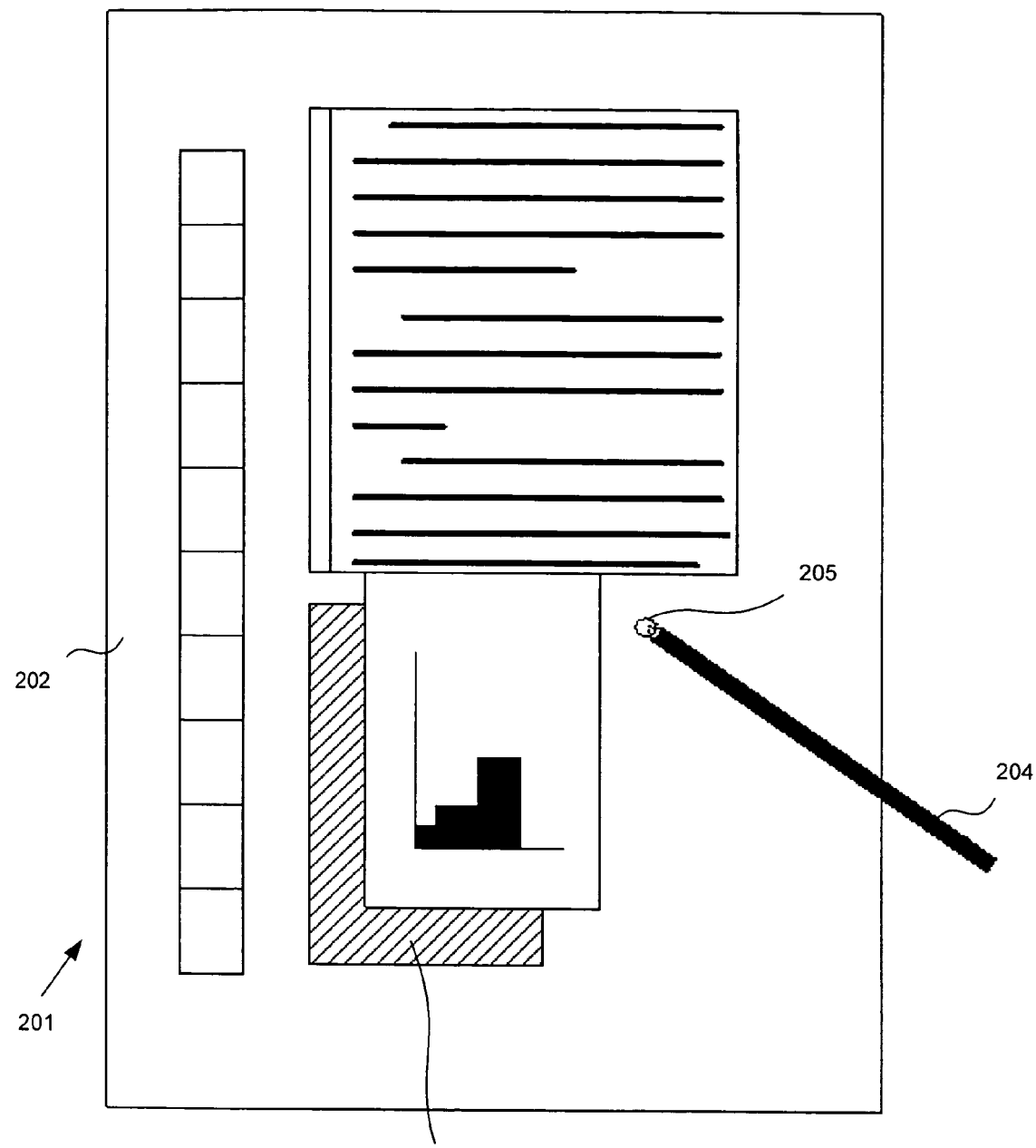
FIG. 2 illustrates an embodiment of a Tablet PC computing environment in which certain aspects of the present invention may be implemented.

FIG. 2 illustrates an exemplary tablet PC 201 that can be used in accordance with various aspects of the present invention. Any or all of the features, subsystems, and functions in the system of FIG. 1 can be included in the computer of FIG. 2. Tablet PC 201 includes a large display surface 202, e.g., a digitizing flat panel display, preferably, a liquid crystal display (LCD) screen, on which a plurality of windows 203 are displayed. Using stylus 204, a user can select, highlight, and/or write on the digitizing display surface 202. Examples of suitable digitizing display surfaces 202 include electromagnetic pen digitizers, such as Mutoh or Wacom pen digitizers. Other types of pen digitizers, e.g., optical digitizers, may also be used. Tablet PC 201 interprets gestures made using stylus 204 in order to manipulate data, enter text, create drawings, and/or execute conventional computer application tasks such as spreadsheets, word processing programs, and the like.

The stylus 204 may be equipped with one or more buttons or other features to augment its selection capabilities. In one embodiment, the stylus 204 could be implemented as a "pencil" or "pen", in which one end constitutes a writing portion and the other end constitutes an "eraser" end, and which, when moved across the display, indicates portions of the display are to be erased. Other types of input devices, such as a mouse, trackball, or the like could be used. Additionally, a user's own finger could be the stylus 204 and used for selecting or indicating portions of the displayed image on a touch-sensitive or proximity-sensitive display. Consequently, the term "user input device", as used herein, is intended to have a broad definition and encompasses many variations on well-known input devices such as stylus 204. Region 205 shows a feedback region or contact region permitting the user to determine where the stylus 204 as contacted the display surface 202.

In various embodiments, the system provides an ink platform as a set of COM (component object model) services that an application can use to capture, manipulate, and store ink. One service enables an application to read and write ink using the disclosed representations of ink. The ink platform may also include a mark-up language including a language like the extensible markup language (XML). Further, the system may use DCOM as another implementation. Yet further implementations may be used including the Win32 programming model and the .Net programming model from Microsoft Corporation.

Inadvertent Touch Rejection

Before discussing various embodiments, it should be noted that numerous types of touch-sensitive devices, such as touch-sensitive displays, exist. Touch-sensitive devices may detect changes in pressure, light, displacement, heat, resistance or capacitance, just to name a few variations. Furthermore, touch-sensitive devices may be configured to detect an input device such as a dedicated stylus when the dedicated stylus is moved within a proximity zone. For example, a dedicated stylus could emit or retransmit a signal or could include a particular material (such as a magnet) or a particular configuration of a material (such as a coil) in a tip. Numerous variations are possible depending on the hardware used to detect the touch.

Figure 3:
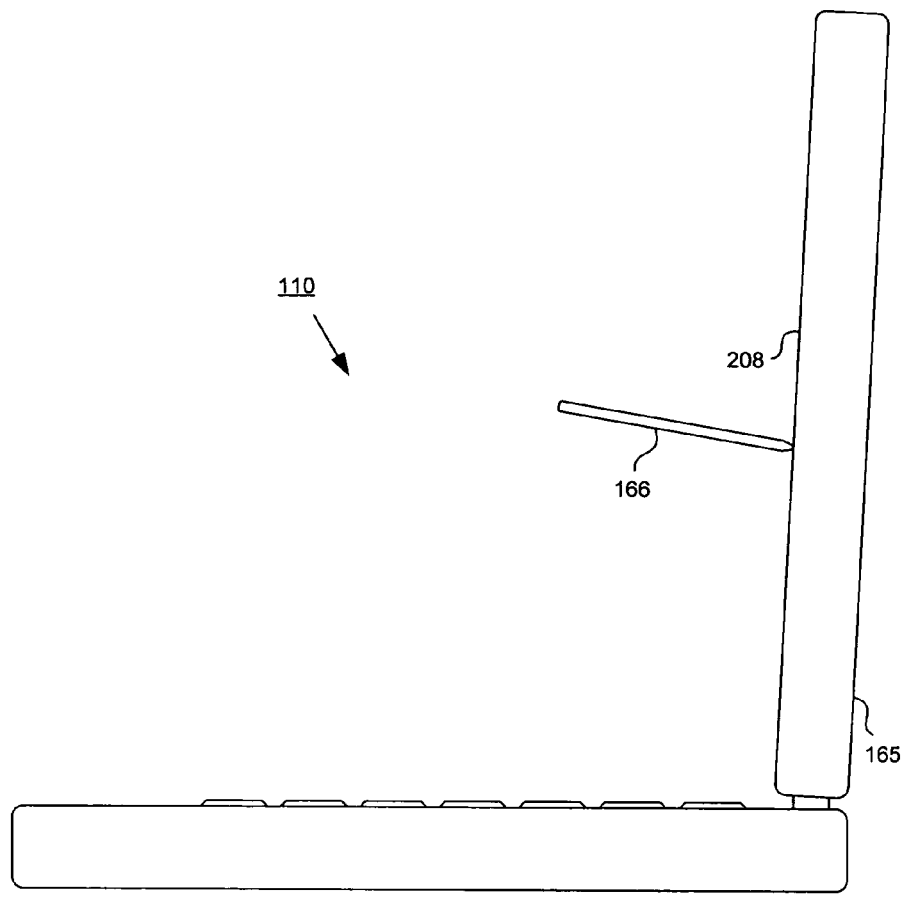
FIGS. 3-4 illustrate embodiments of a computer in which certain aspects of the present invention may be implemented.
Figure 4:
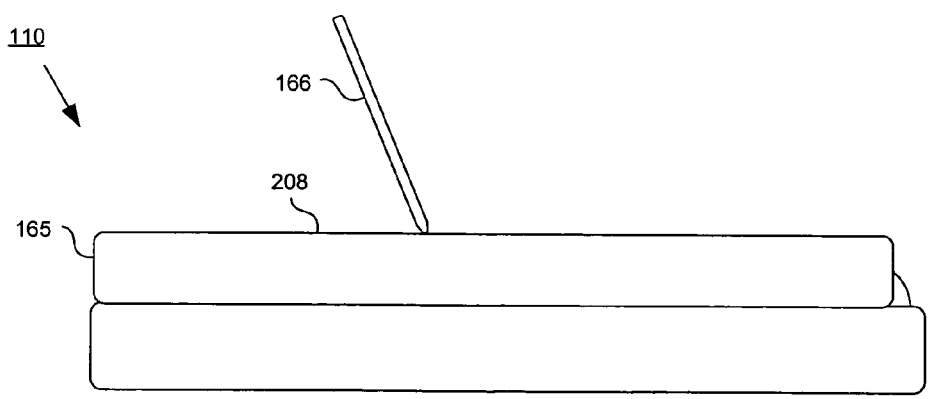

Looking at FIG. 3, an embodiment of a computer 110 in a typical laptop configuration is depicted. Somewhat similarly, FIG. 4 illustrates an embodiment of a computer 110 in a tablet configuration. As is known, variations in size and performance are possible, thus the depicted computers could be made smaller so as to fit within a user's pocket. In addition, some computers are configured to transition between laptop and tablet configuration. In addition, some computers may mount the display separately. In both depicted embodiment, however, a touch-sensitive device 165 is incorporated as part of the computer 110. As illustrated, the touch-sensitive device 165 is also a display; however the touch sensitive device 165 is not so limited. The touch-sensitive device 165 includes a touch-sensitive surface 208 on which a stylus 204, which may be a finger, can write, tap or provide other types of input.

In either configuration, it is expected that occasionally a person will inadvertently touch the screen with the person's hand while providing input to the touch-sensitive surface. For example, typically a person will rest a portion of their hand on the writing surface while writing. In certain embodiments, as discussed in greater detail below, this extra touch is determined to be inadvertent and is automatically rejected.

A touch-sensitive display can be configured to process the touch and determine whether the touch should be rejected based on characteristics of the touch alone. For example, a display can compare the pressure and area of the touch to determine whether the touch matches expected touch patterns typically used for input. This single level of control, while useful, can also benefit from additional processing.

Figure 5:
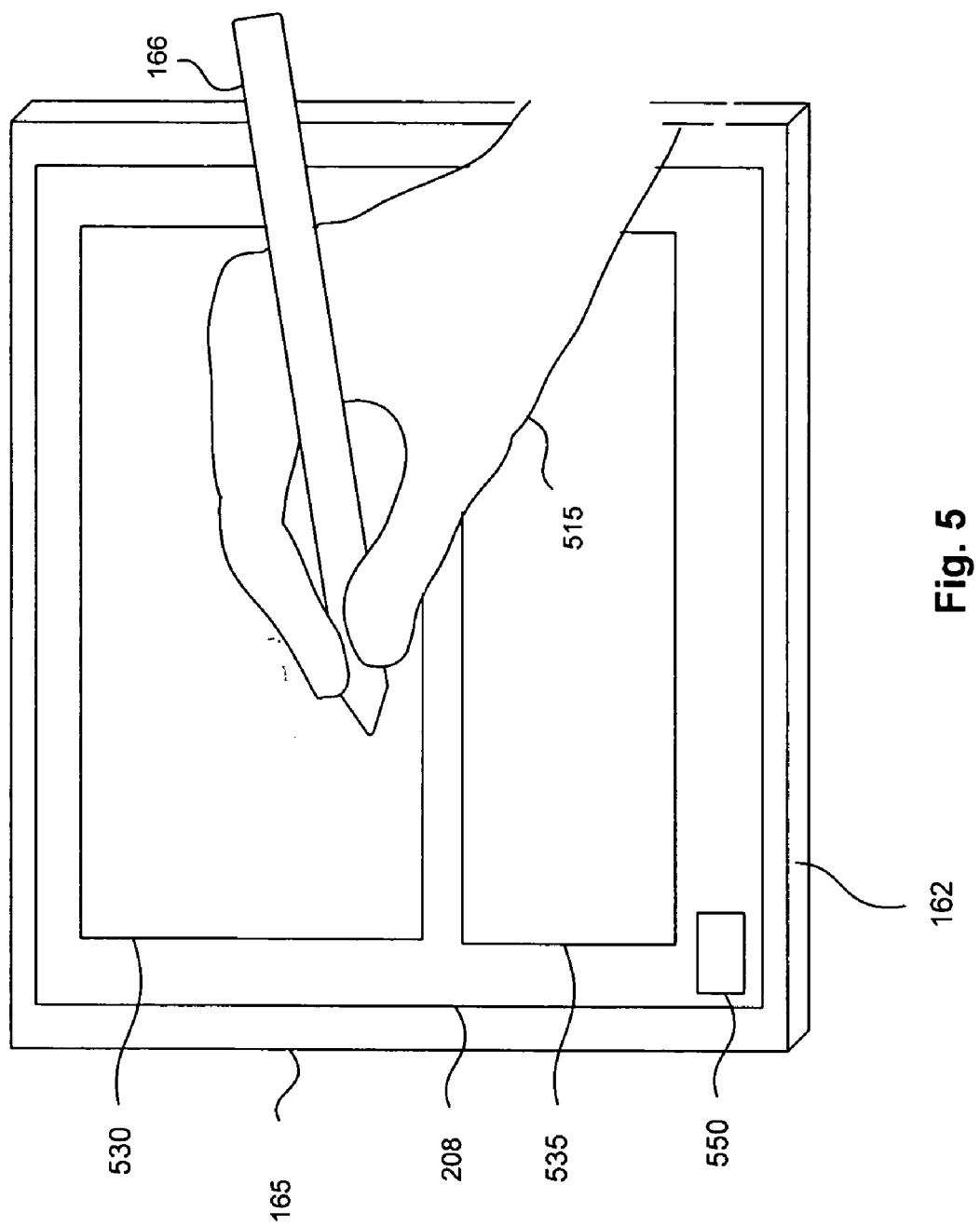
FIG. 5 illustrates an embodiment of user interface with a touch-sensitive device in which certain aspects of the present invention may be implemented.

Turning to FIG. 5, an embodiment of an individual using a touch-sensitive display is depicted. The user is writing with a dedicated stylus 204 and is holding a hand 415 over the touch-sensitive surface 208 of the touch-sensitive device 165. It should be noted that, depending on the configuration, a housing 162 of the computer 110 may also be the housing of the touch-sensitive device 165. Alternatively, the housing 162 of the computer 110 may be split into portions that may be connected, either indirectly or directly and either wirelessly or wired. Displayed on the touch-sensitive surface 208 is a first window 530, a second window 535 and a third window 550. As is known, a window refers to a portion of a screen display associated with an application or with an OS process.

As can be appreciated, the dedicated stylus 204 is positioned so as to electronically create ink (e.g. ink) on the first window 530 while the hand is positioned over the first window 430 and the second window 535. However, neither the hand 515 nor the dedicated stylus 204 is positioned near the third window 550. More will be said with respect to this below.

Figure 6:
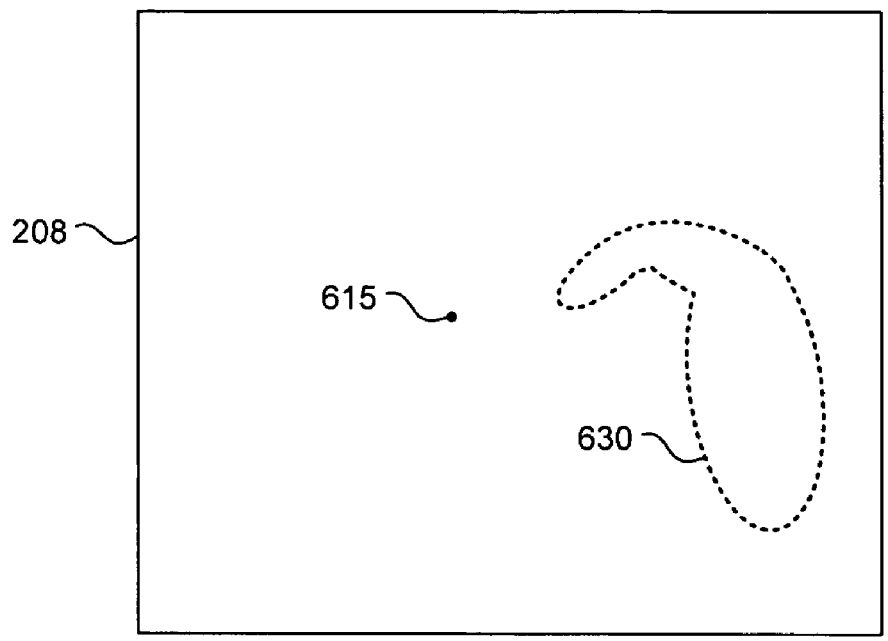
FIGS. 6-7 illustrate embodiments of touches on a touch-sensitive surface in which certain aspects of the present invention may be implemented.

Turning to FIG. 6, a touch-sensitive surface 208 is depicted, the touch-sensitive surface 208 being exemplary of what may be provided on a touch-sensitive display. Provided on the touch-sensitive surface 208 is a first touch 615 and a second touch 630. As can be appreciated, give the discrepancy in size and shape, it is relatively simple to reject the touch 630 as being unwanted. For example, while a user's finger can come in a range of sizes, the touch 630 plainly exceeds such a range and therefore a simple determination that the area of touch 630 exceeds a predetermined limit could be used to reject the touch. In an alternative embodiment, the shape of the touch 630 may be used to determine the touch was inadvertent.

Figure 7:
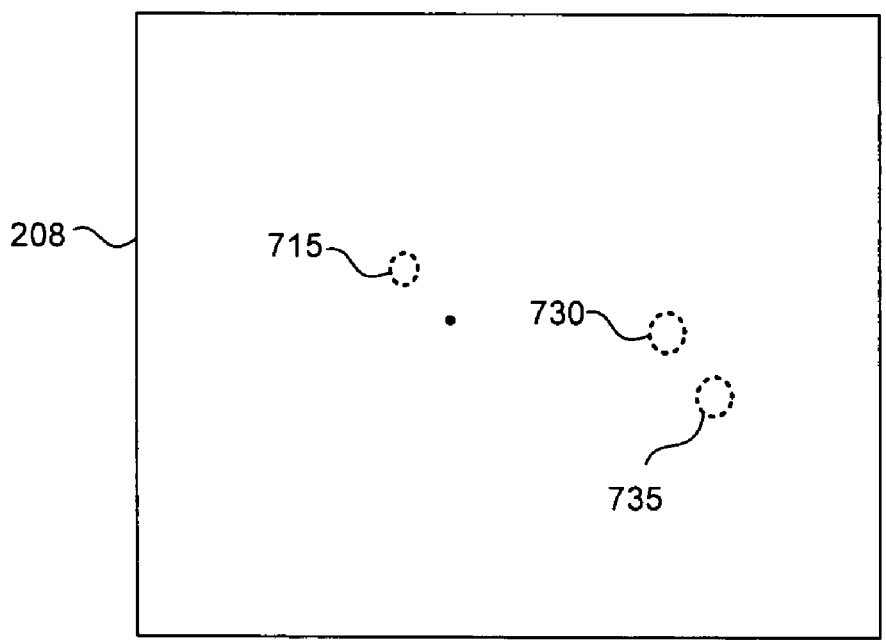

Turning to FIG. 7, an embodiment of a touch-sensitive surface 208 is depicted with alternative touches 715, 730 and 735. While the touch 715 is slightly smaller than the touch 730 or touch 735, they all fit within a range of expected variations of a finger size and therefore it is difficult to reject the touches as being inadvertent based on pressure and area alone. As can be appreciated, touches typically vary with time. Therefore, the touches 730 and 735, while initially resembling points similar to what would be expected for a finger, may eventually grow to resemble touch 630.

In other words, because of the sampling frequency of the touch-sensitive device 165, which may be greater than 200,000 Hz, the touch-sensitive surface 208 may initially detect a touch that resembles the touch 730 or 735 (or both) and over time the detected touch will start to resemble the touch 630.

Thus, a touch-sensitive device 165 (FIG. 5) might initially determine that touch 715 and touches 730 and 735 were acceptable touches. In other words, the touch-sensitive device 165 would indicate that touches 730 and 735 both had high reliability. In contrast, the touch-sensitive device 165 would indicate that touch 630 had low reliability. As can be appreciated, the change in the touch may affect the reliability determination. It should be noted that reliability may be based on the measurable information relating to the touch such as, but not limited to, pressure, area, rates of change in characteristics of the touch, and velocity of movement, thus different touch-sensitive devices may use different mechanisms for determining the reliability of a particular touch based on their underlying technology. Furthermore, certain touch-sensitive devices may be better at accurately determining reliability for a particular touch or type of touch.

Figure 8B:
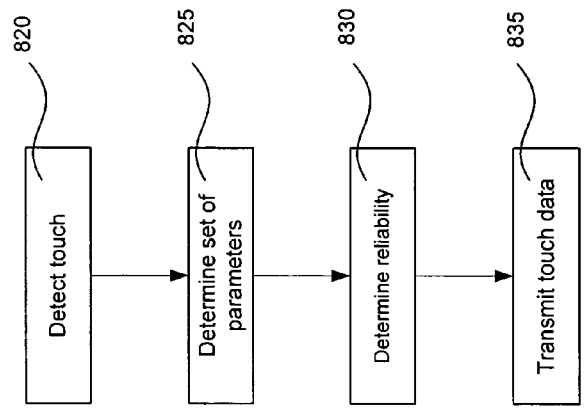
FIG. 8b illustrates an alternative method of rejecting an inadvertent touch that may be used in accordance with one or more aspects of the present invention.
Figure 8A:
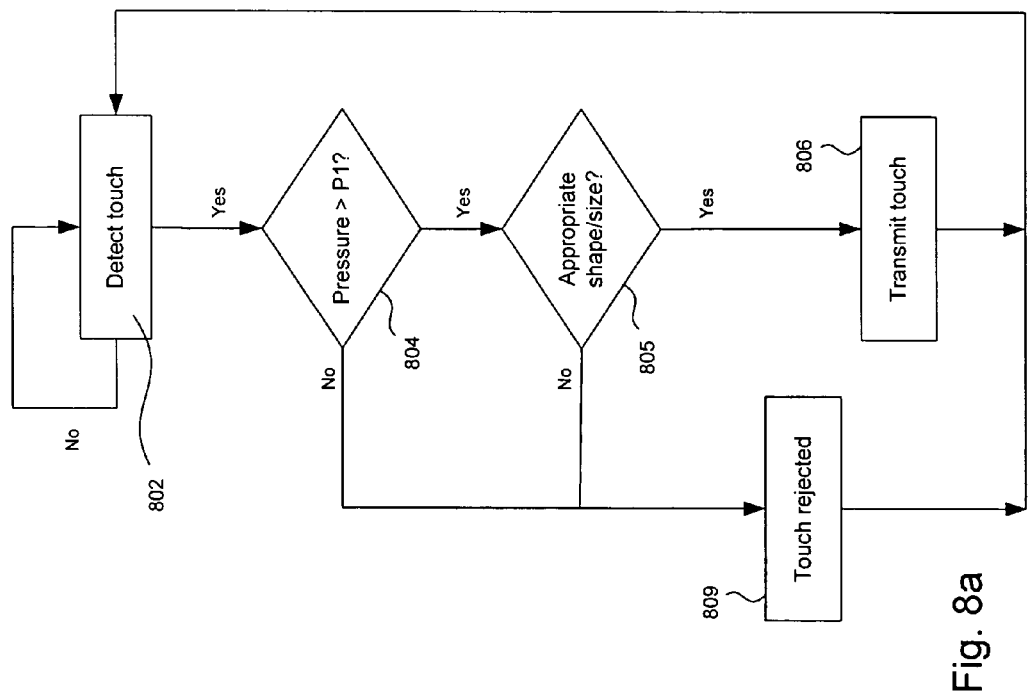
FIG. 8a illustrates a method of rejecting an inadvertent touch that may be used in accordance with one or more aspects of the present invention.

FIG. 8a illustrates a method that may be used to determine whether to reject the touch 530. First in step 802 a touch is detected. Next in step 804, a check is made to see if the pressure applied by the touch exceeds some minimum. If it does, then in step 805 a check is made to see if the touch is the appropriate size or shape. In at least some embodiments, this can be done by comparing the touch to a predetermined set of sizes or shapes. If the touch meet the requires of steps 804 and 805, then in step 806 the touch is treated as an input and transmitted to the appropriate software module. If the touch fails to pass either step 804 or step 805, then in step 809 the touch is rejected.

As can be appreciated, however, the method of FIG. 8a may be unable to determine that certain types of inadvertent touches, such as the touch 730, should be rejected. Therefore, a method as illustrated in FIG. 8b may be used.

First in step 820, a touch is detected. As noted above, the method of detecting the touch depends on the type of hardware chosen. Thus, a resistance based touch-sensitive surface would detect changes in resistance and a capacitance based touch-sensitive surface would detect changes in capacitance. The present invention is not limited to a particular type and therefore the decision of which type of touch-sensitive device to use is primarily a design choice based on tradeoffs between different technologies and their respective costs and features.

Next in step 825, a set of parameters are determined. The parameters may include, but are not limited to, location of the touch, area of the touch, shape of the touch, pressure of the touch, and number of points of contact of the touch. The parameters may also be specific to a particular hardware such as change in resistance or capacitance. It should be noted that different parameters may have different ranges of values, depending on the type of parameter. Thus, a parameter for area may be in square meters while a parameter related to a change in resistance might be in ohms or volts.

It should be noted that, depending on the sampling frequency, two touches that are related, such as two portions of the same palm, may not touch the touch-sensitive surface at the same time. Therefore, two distinct touches can be joined together if they are nearby or are initially detected at about the same time. In addition, if two touches, such as the touches 730 and 735 of FIG. 7, move together they can also be determined to be part of the same touch.

In addition to the above parameters, derived parameters such as the rate of change in a parameter can also be determined. If a rapid sampling rate is used, the rate of change per sample may be relatively small but even relatively small rates of change can be useful to determine whether a touch should be rejected. Furthermore, a change or rate of change over a series of samples may also be determined. The level of noise in a parameter value is another parameter that can be determined. Therefore, the parameters can be provided for all types of physically detectable characteristics of the touch as well as derivations of these detectable characteristics. In addition, these characteristics may be operated on with filters to smooth or otherwise process the data. For example, the noise in a parameter may be filtered out. Thus, in at least some embodiments, the noise itself would be filtered while the level of noise would be used as a parameter. Filters may provide additional types of processing. For example, a centroid of the area of the touch may be determined so as to provide a more precise location of the touch. In addition, data points that suggest a fluctuation too fast to be representative of a human touch and/or an intended touch can be filtered. Numerous other filters may be used as desired.

Next in step 830, the reliability of the touch is determined. In an embodiment this can be done by the touch-sensitive device 165 itself. For example, looking at FIG. 10, a computing environment 100 includes a touch-sensitive surface 208 in communication with a firmware 1105. In an embodiment, the firmware may be software embedded into the touch-sensitive device. The firmware 1105 may determine the reliability value based on a set of parameters. Depending on the type of hardware, components such as A/D converters and other known circuits may be placed between the touch-sensitive surface 208 and the firmware 1105 so as to transform the physical touch into digital data in a known manner. For example, a circuit that detects changes in resistance, which is an analog measurement, could provide these changes to an A/D converter so as to translate the changes into digital values in a known manner.

In an embodiment, the firmware 1105 may be omitted and the reliability determination may be done by a driver 1112. As is known, driver can provide a level of abstraction that allows higher level programs, such as an operating system, to communicate or receive information from a particular piece of hardware but, unlike the firmware, a driver is typically provided separate from the hardware. In an alternative embodiment, both a driver and firmware may be used in series or in parallel to transmit information to the software module 1115. In another alternative embodiment, the firmware 1105 may generate the set of parameters and the driver 1112 may determine the reliability value. As can be appreciated, the firmware 1105 and the driver 1112 are both examples of a device driver that provides an interface between the operation system and the specific hardware used by the touch-sensitive device 165.

The reliability may include a number of factors such as the value of one or more parameters along with the rate of change of one or more parameters. In at least some embodiments, the reliability can be a probability that the touch is intended. For example, the height (h) and width (w) of a touch can be used to calculate a probability (p) that a touch was intended:

$$p=f(a)+f(s)$$

where $f(a)=\alpha/(\epsilon+\sigma h*w)$; and $$f(s)=\alpha/(\epsilon+\beta|(h^2-w^2)|)$$

In the above equation, $\alpha$, $\beta$, $\sigma$, and $\epsilon$ may represent constants (or more complex functions) that can be used to weight the importance of various factors, and f(a) represents some function of area while f(s) represents a function of shape, both of which are based on the height (h) and the width (w). In general, however, as can be appreciated from the above equation, the probability that the touch is an intentional touch increases as the area of the touch decreases and the probability also increases the more closely the shape of the touch has the same height and width. As can be readily appreciated from this example, a large number of variations in how the reliability is determined are possible. In an alternative embodiment, the reliability may be a sum of the number of parameters that are within an accepted range. Thus, there are an almost unlimited number of variations in how the reliability value may be determined, subject to inherent limitations or unique characteristics of the hardware chosen.

Figure 11:
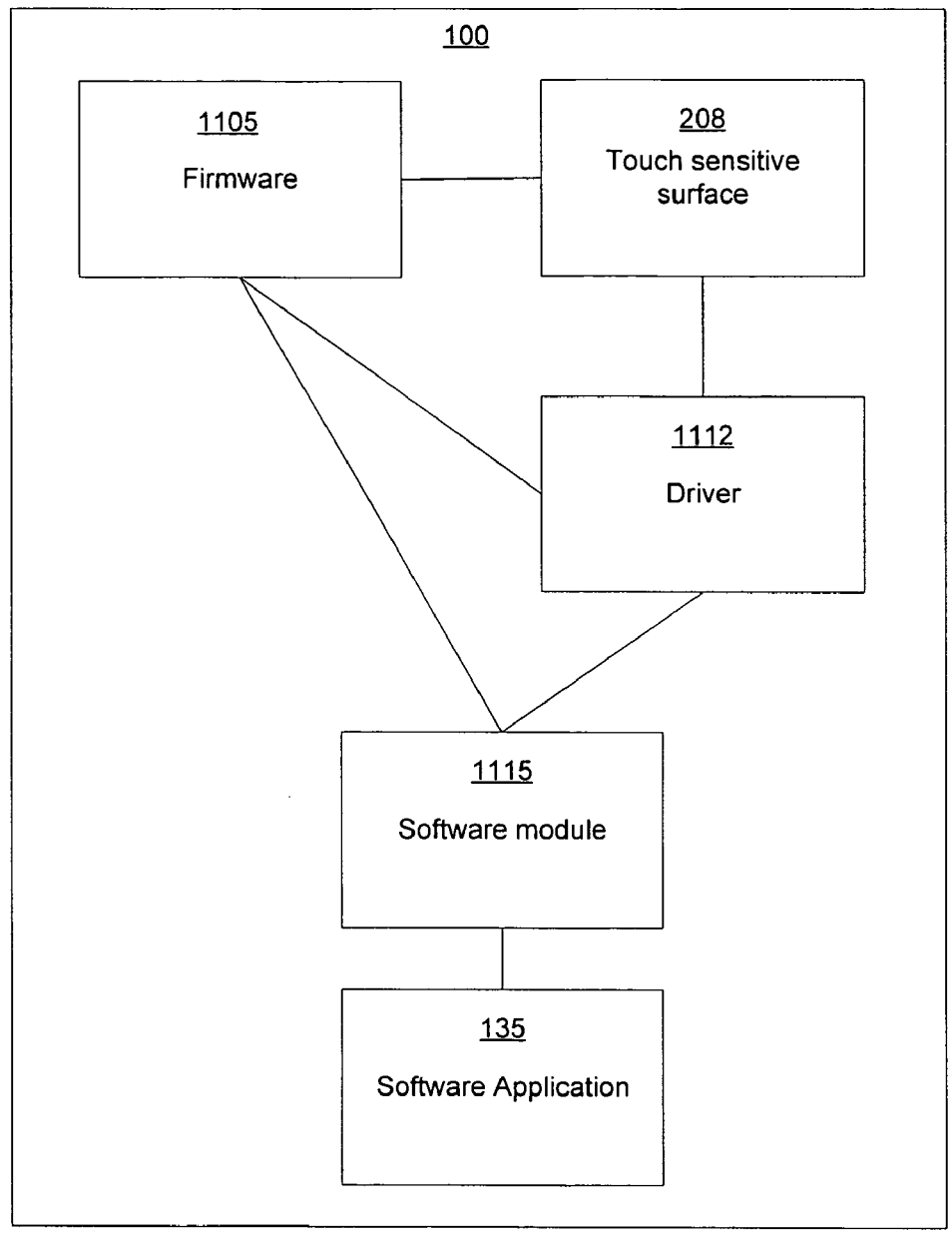
FIG. 11 illustrates a schematic of an exemplary computing environment that may be used in accordance with one or more aspects of the present invention.

After the reliability value is determined, in step 835 the touch data is communicated (e.g. transmitted) to the software module 1115 (FIG. 11) which uses the reliability value to generate a confidence level. The software module may be part of the operating system or some other separate software module that is configured to receive the reliability data. The touch data may include just the reliability value and a location of the touch or it may include additional details of the parameters, as desired.

In at least some embodiments, the firmware 1105 and/or the driver 1112 can be configured to process a sufficient number of variables so as to make the reliability value, which may also be an array of values, more valuable. In an alternative embodiment, the firmware 1105 and/or the driver 1112 may make minimal calculations and allow the software module to analyze more of the data. In such an embodiment, the parameters may be observable features without derived values and the confidence determination may include calculations related to changes in the parameters over time.

Figure 9:
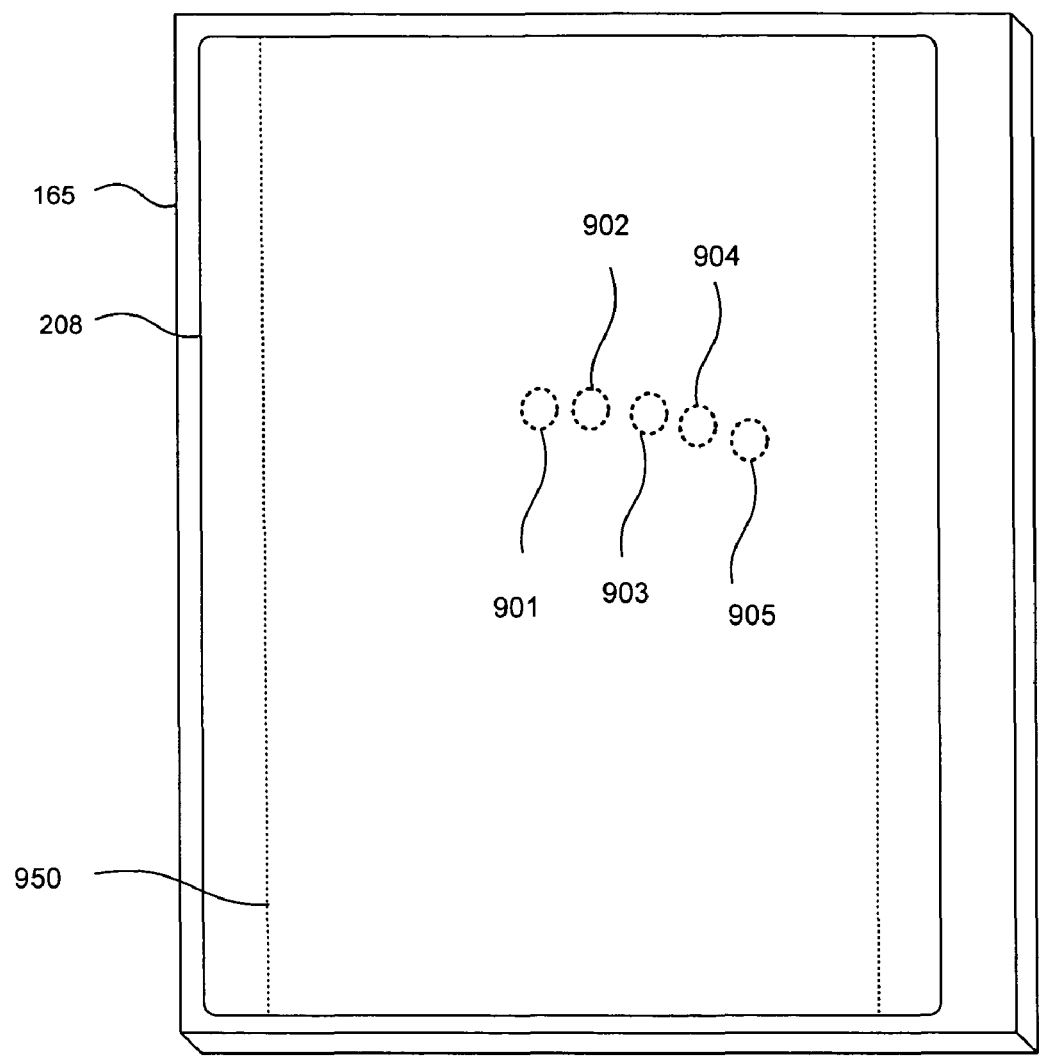
FIG. 9 illustrates an embodiment of a set of touches on a touch-sensitive surface in which certain aspects of the present invention may be implemented.

As briefly noted above, typically a touch will change over time, either in location or shape or size or some other parameter. For example, FIG. 9 illustrates a touch-sensitive device 165 with a touch-sensitive surface 208. Depicted on the touch-sensitive surface 208 are five touches 901-905. The touches 901-905 represent 5 touches detected in subsequent intervals. As can be appreciated, touches 901-905 may be the same touch over time or may actually be different touches. While depicted as being similar, values for some or all of the parameters previously discussed may be different for some or all of touches 901-905.

Turning to FIG. 10, a diagram for a data structure holding data relating to multiple touches is provided. P1-1 represents a first parameter of the touch 901, P1-2 represents a first parameter of touch 902, P1-3 represents a first parameter of touch 903, P1-4 represents a first parameter of touch 904 and P1-5 represents a first parameter of touch 905. Similarly, P2-1 through P2-5 represent a second parameter for touches 901-905, respectively. In at least some embodiments, the first parameter is an area of the touch and the second parameter represents the shape of the touches. It should be noted that additional parameters may be added and that the parameters P1 and P2 may represent any other parameters desired. For example, a parameter for location or velocity or acceleration of the touch may also be included. It should be noted that a parameter based on a change over time such as velocity will initially have a value of zero but, assuming a reasonably high sampling frequency, will quickly become some non-zero value.

Once the parameters for the touches are determined, a reliability value R1 through R5 may be determined for each of the touches 901-905, respectively. As can be appreciated, the reliability of each of the touches 901-905 depends on values of P1 and P2, thus each of the reliability values R1-R5 for each of the touches 901-905 may be independent of the other reliability values.

Figure 12:
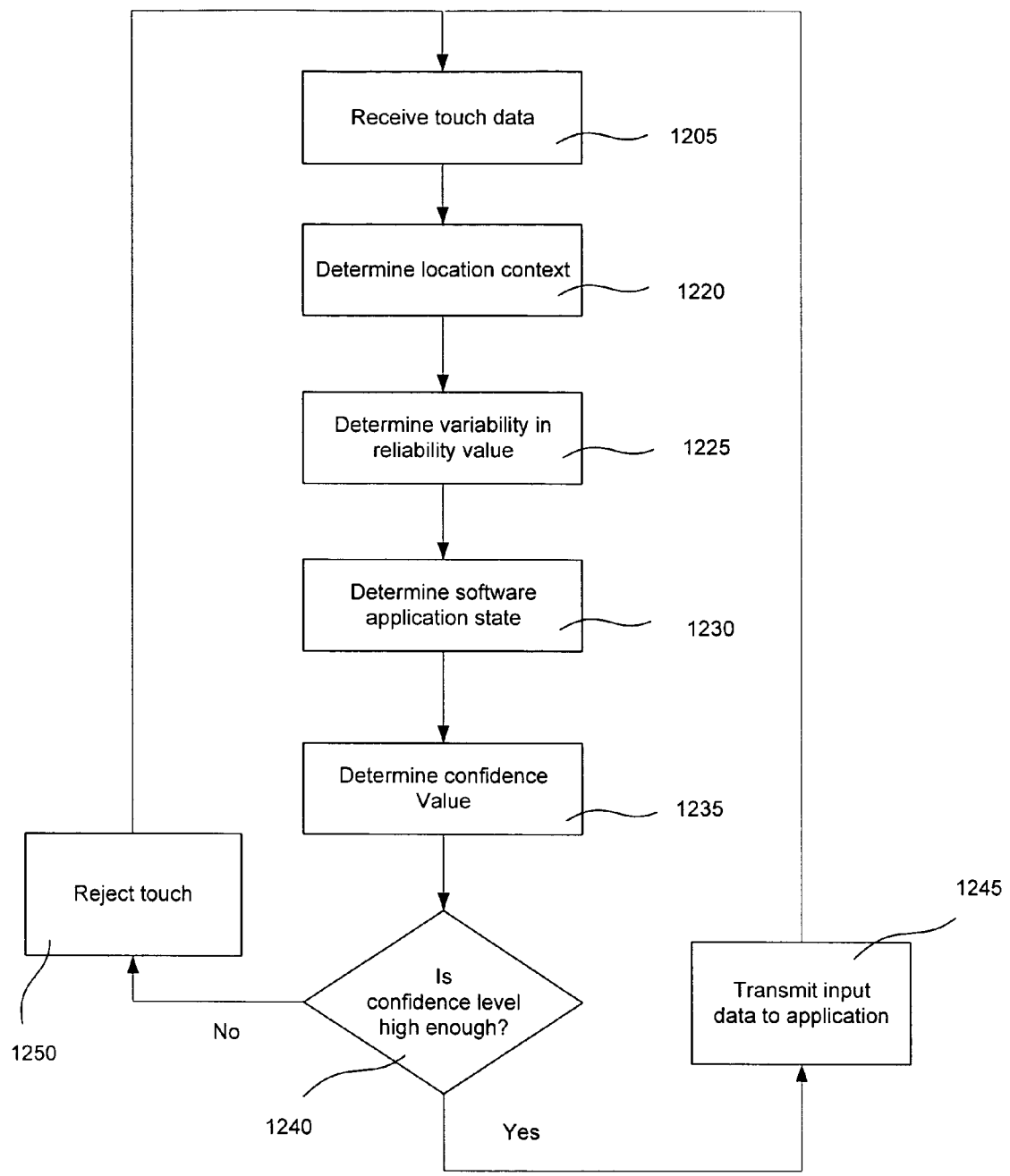
FIG. 12 illustrates a method for determining whether to reject a touch that may be used in accordance with one or more aspects of the present invention.

Once the reliability value for the touch is determined, it can be communicated or transmitted to the software module 1115 (FIG. 10). In an embodiment, the software module may be, without limitation, the operating system 134 (FIG. 1). The software module 1115 then uses the reliability value to determine a confidence value. FIG. 12 illustrates an embodiment of such a determination.

First in step 1205, the reliability data is received. In at least some embodiments, the reliability data may include the reliability value and a location of the touch. In an alternative embodiment, the reliability data may include the reliability value, the location of the touch and one or more additional parameters.

Next in step 1220, the software module determines a location context. This can be done by querying a software application 135. The location context is part of an activity context, and the location context includes the location of various windows or regions on the display along with their intended use. Referring back to FIG. 5, a touch may be located in the window 530, in the window 535, in the window 550 or not in any of the above windows. Different applications may vary the treatment of touches in different windows. In an embodiment, an application may ignore any touch outside the window 530. In another embodiment, an application may accept certain types of gestures in the window 535. In yet another embodiment, any touch in the window 550 may trigger an action. This latter embodiment may be useful if the window is located in a position of the touch-sensitive surface that is unlikely to be inadvertently touched. In yet another embodiment, an application may require a more perfect touch, thus causing a greater range of touches to be rejected within the window 530.

As can be appreciated, variations are possible and different applications can reject or accept different ranges of touches so as to optimize the rejection of unintentional touches versus the accidental rejection of intentional touches. And for certain windows were an input is desired, any touch may be sufficient. Therefore, the location context provides information to the software module regarding what window or application is or would be affected by touch and what range of touches (e.g. the needed confidence level for a touch) are acceptable in that window or area. It should be further noted that if desired, the range of acceptable touches may be user configurable.

Next in step 1225, the software module determines the variability in the reliability value. Referring back to FIG. 9, in an embodiment where the touches 901-905 represent the same touch over time, the touch may have a high reliability value for R1, R3 and R5 and a low reliability value for R2 and R4. The expected behavior for an intentional touch is a more consistent reliability value; therefore such a variation in reliability would suggest the touch should be rejected. For example, a palm resting on a touch-sensitive surface while the user was using a stylus would typically progress through a range of shapes and sizes in the touch as the user moved his or her hand across the touch-sensitive surface.

Next in step 1230, the state of an active application, which may also be part of the activity context, is considered. This may include the time the application has waited for an input, the type of input expected and historical patterns of input, to mention a few variations. For example, if a user has consistently used a stylus to enter data in an application window, then a touch in that window that does not match the stylus may be initially rejected. As a user may interact in a unique manner with different applications, this allows each application to be treated uniquely.

Next in step 1235 a confidence level is determined. The confidence level incorporates one or more factors of the reliability of the touch along with the activity context to make a more informed decision of whether to reject the touch. Thus, the confidence level combines one or more factors related to reliability with one or more factors related to activity context. It should be noted that the reliability factors may include a determination of an average reliability over a greater period of time, which may be one to five seconds and may also include variations in the reliability over time. As can be appreciated, the activity context can vary and may include, but is riot limited to, a determination of whether the location of the touch is in a window associated with an application, a determination of an active application, a determination that the area being touched is an active area, a determination of whether multiple touches are being made substantially simultaneously, a determination of whether multiple touches are expected, a determination of whether a profile of the touch matches a known gesture, a determination of how a particular application treats touches, and a determination of whether another valid touch is being made in a different location on the touch-sensitive display. Therefore, the calculation of the confidence level may be any desirable algorithm and may vary with particulars of hardware implementations.

It should be noted that the confidence level may also involve a consideration of parameters used to determine the reliability value. Historical variations in a particular parameter such as the velocity, direction of movement or the number of points of contact of a touch (which are really the composite of a number of touches that can be linked together because of their proximity and the frequency of sampling) may also be considered. For example, while the firmware may determine that the touch has a low reliability, the software module may determine that the touch represents a gesture specific to an application and therefore an appropriate input may be transmitted to the application. This allows customized gestures to be associated with each application, even if the gestures are not recognized by the firmware or the driver. However, the firmware or driver may also include the ability to recognize certain gestures. Therefore, as can be appreciated, numerous variations exist in how the parameters related to the touch are handled.

Next in step 1240, a comparison of the confidence level to a predetermined level is made. As noted above, the predetermined level may change depending on a number of factors such as, but not limited to, the location of the touch and which application is active. If the confidence level of the touch meets the predetermined level, then in step 1245 the touch is communicated or transmitted to the application as an input. If the confidence level of the touch does not meet the predetermined level, then in step 1250 the touch is rejected.

It should be noted that additional steps may be added to the above method and that steps may be combined or omitted as desired.

Figure 13:
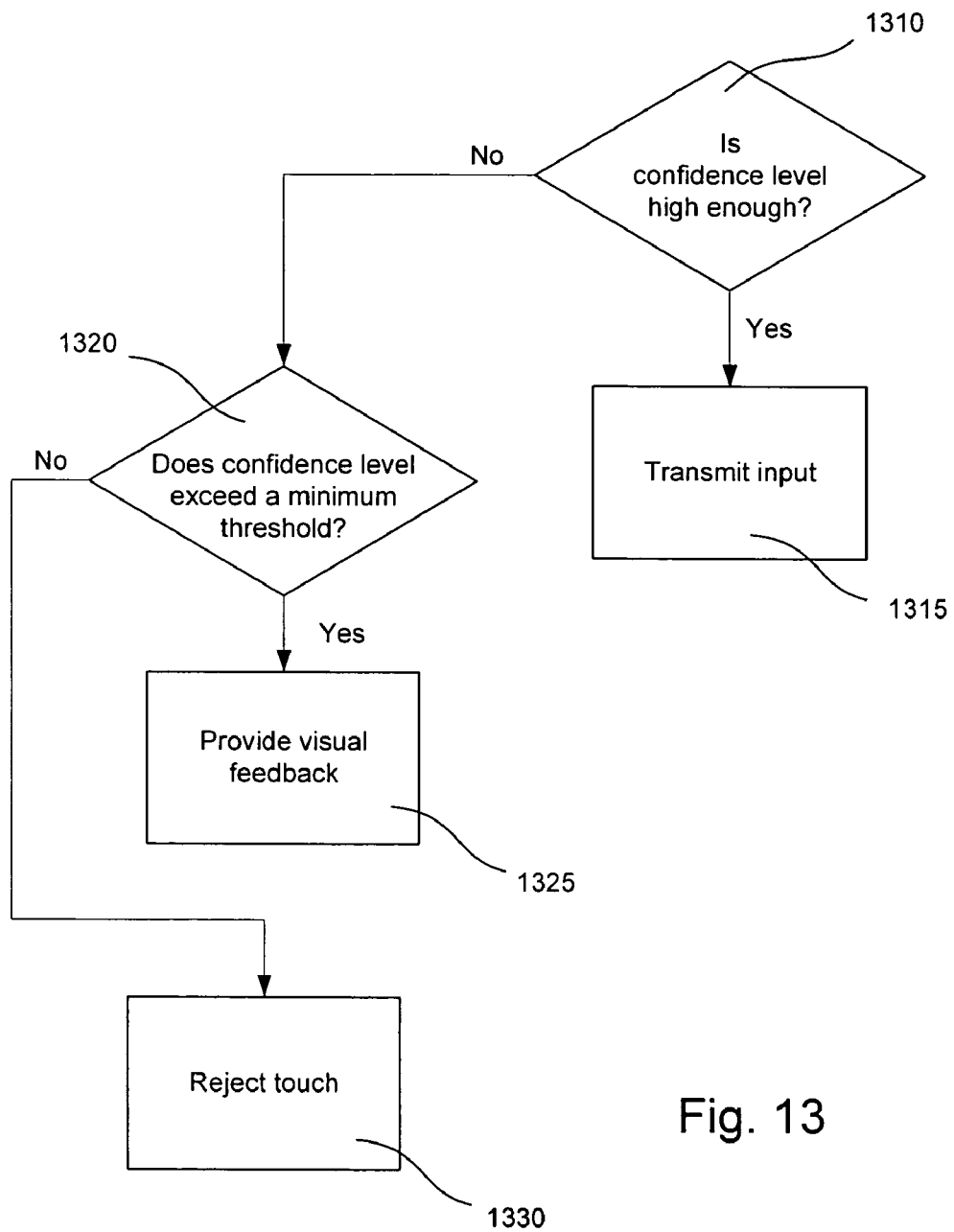
FIG. 13 illustrates a method for evaluating a confidence level of a touch that may be used in accordance with one or more aspects of the present invention.

Turning to FIG. 13, an embodiment of a two step method of evaluating a confidence level of a touch is disclosed. As can be appreciated, the method of FIGS. 12 and 13 could be combined. First in step 1310, a check is made to see if the confidence level of the touch exceeds a predetermined level. If the confidence level does exceed the predetermined level, then in step 1315 an input associated with the touch is communicated or transmitted to the application.

If the confidence level of the touch does not meet the predetermined level, then in step 1320 a second check is made to see if the confidence level of the touch exceeds a threshold level. If the confidence level does exceed the threshold level, in step 1325 a visual feedback is provided to the user. In at least some embodiments a cursor or a widget or some other graphical indicator may be moved to or near the location where the touch is located. However, if the input fails to meet the threshold level, in step 1330 the touch is rejected.

It should be noted that as the touch probably represents a finger or palm, it may be useful to make the cursor, or whatever graphical feedback is used, observable even if the user's hand is partial occluding a portion of the display. In an embodiment, a widget, such as a graphical user interface that may be used to provide additional precision when a user is interacting using a finger, may be positioned near the touch contact. As can be appreciated, this provides the user with feedback that something has caused the widget to move. The user can appreciate that an inadvertent touch may have caused the widget to move. However, no actual input will be transmitted in this embodiment; therefore the user does not have to undo something that was unintentional. Furthermore, if the user intended to provide an input but did so in a manner that is interpreted as a low confidence level touch, the user will be able to use the widget to provide the desired input and will not be frustrated by the rejection of intentional input.

Returning to FIG. 10, as can now be appreciated, the confidence levels C1-C5 may be related. In an embodiment, each of the columns represents a subsequent period of time for the same touch. An initially high R1 value may not provide a high confidence level because of the limited historical knowledge regarding the touch. As the reliability value continues to be high for R2-R5, however, the historical values and a minimal amount of variability allow the confidence level to be generated as high for all the touches represented by each column. Thus, the detected touches may be treated as intentional touches.

Conversely, if the reliability value fluctuates with time or the touch moves outside an expected region of contact, the confidence level, which may have started out higher, will drop. Therefore, it may be useful to delay the decision of whether to communicate the touch as an input or to reject it.

While delaying the determination of whether to reject the touch allows for a more accurate determination, the user typically wants the system's response to be fluid and immediate. To minimize the user's perception of the delay, therefore, the reliability data can be transmitted as generated and the software module 1115 (FIG. 11) can control the delay. The delay may be varied depending on the confidence level, the location of the touch and the state of an application (e.g. whether the application is expecting an input). While not required, the reliability value and other data associated with the touch may be transmitted to the software module 1115 using a universal serial bus 2.0 protocol. As can be appreciated, the advantage of using such a protocol is the availability of relatively high bandwidths, thus even relatively high sampling frequencies may be used effectively. In addition, an increased bandwidth allows greater levels of detail to be passed along so that the confidence level determination may take into account additional information.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Numerous other embodiments, modifications and variations within the scope and spirit of the appended claims will occur to persons of ordinary skill in the art from a review of this disclosure.

We claim:

1. In a computer system having a graphical user interface including a touch-sensitive device, a method of distinguishing between intentional and inadvertent contact on the touch-sensitive device, the method comprising:
   receiving a touch on the touch-sensitive device;
   determining whether a confidence level of the touch exceeds a predetermined level based in part on historical variations in one or more of a set of parameters of the touch, by:
      providing a reliability value of the touch to a software module, the reliability value based on a set of parameters related to the touch, wherein the software module is a part of an operating system; and determining the confidence level of the touch based on the reliability value and an activity context,
wherein the activity context comprises a user pattern which comprises a consistency demonstrated by a user using a stylus to enter data in a window of an application,
wherein a parameter of the set of parameters includes a level of noise associated with the parameter of the set of parameters; and
if the touch exceeds the predetermined level, communicating an associated input to an application, the predetermined level depending on a location of the touch on the touch-sensitive device, a particular application that is active when the touch-sensitive device receives the touch, or both.

2. The method of claim 1, wherein the receiving a touch on the touch-sensitive display comprises:
detecting the touch of a user's hand on a first area of the touch-sensitive surface; and
generating the set of parameters related to the touch.

3. The method of claim 2, wherein the set of parameters consists of at least one parameter that is selected from a list consisting of an area of the touch, a shape of the touch, an area bounded by the touch, the location of the touch, and a number of points of contact in the touch.

4. The method of claim 2, wherein the set of parameters consists of at least one of the parameters that is selected from a list consisting of a velocity of the touch, a rate of change in area of the touch, and a rate of change in shape of the touch.

5. The method of claim 2, wherein the generating of the set of parameters comprises:
recording values for a set of characteristics associated with the touch;
determining a rate of change of a first characteristic in the set of characteristics; and
providing the rate of change of the first characteristic as one of the parameters in the set of parameters.

6. The method of claim 1, wherein the providing a reliability value is performed by a device driver and the providing comprises:
generating the set of parameters related to the touch; and
calculating the reliability value based on the set of parameters.

7. The method of claim 1, wherein the determining the confidence level further comprises:
evaluating changes in the reliability value over time; and
determining whether the touch is provided in the window of the application.

8. The method of claim 1, wherein the determining whether the touch exceeds a confidence level further comprises:
receiving the reliability value of the touch from a driver; and
evaluating the touch in view of the reliability value and the activity context.

9. The method of claim 8, wherein the touch-sensitive device is a touch-sensitive display and the activity context includes at least one factor selected from the list consisting of:
a determination of whether the location of the touch is in the window of the application,
a determination of an active application,
a determination of a state of the application,
a determination of an active region in the window,
a determination of whether multiple inputs are being provided,
a determination of whether multiple inputs are expected to be provided substantially simultaneously,
a determination of whether a profile of the touch matches a known gesture, and
a determination of whether another valid touch is being made in a different location on the touch-sensitive display.

10. A computer readable storage medium including computer instructions executable by a processor of a computing device, the computer instructions executable to perform:
receiving a touch input from a touch-sensitive display, the touch input including a location of a touch on the touch-sensitive display and a reliability value which indicates a probability that the touch input is intentional, wherein the reliability value is based on a set of parameters comprising:
an area of the touch,
a duration of the touch,
an area bounded by the touch,
the location of the touch,
a number of points of contact in the touch,
a velocity of the touch, and
a rate of change of one or more of the set of parameters;
determining activity context for the touch, wherein the activity context comprises a user pattern which comprises a consistency demonstrated by a user using a stylus to enter data in a window of an application;
determining a confidence level for the touch based on the reliability value and the activity context, and historical variations in one or more parameters of the set of parameters, wherein the historical variations include a composite of at least two touches linked together based on proximity and frequency of sampling;
determining variability of the reliability value over time;
reducing the confidence level to determine a reduced confidence level as the variability in the reliability value increases over time; and
rejecting the touch input based on a comparison between the reduced confidence level and a predetermined level.

11. The computer readable storage medium of claim 10, wherein the determining activity context for the touch comprises:
determining an active application;
determining whether the location of the touch is inside a window associated with the active application;
determining whether the touch matches an expected gesture and a historical pattern of input; and
determining whether the touch is received within an expected period of time.

12. The computer readable storage medium of claim 10, wherein the determining the confidence level for the touch comprises:
determining whether the location of the touch is a window configured to receive a simple touch input; and
if the location is in the window, setting the confidence level to high.

13. The computer readable storage medium of claim 10, further comprising, if the confidence level exceeds the predetermined level, transmitting an input associated with the location of the touch to the application.

14. The computer readable storage medium of claim 10, further comprising, if the confidence level does not exceed the predetermined level but does exceed a threshold level, providing a visual indication on the touch-sensitive display near the touch.

15. A method of rejecting unintentional input to a touch-sensitive display, the method comprising:
receiving a first touch on the touch-sensitive display;
providing a first level of filtering to the first touch;

generating a first reliability value based in part on historical variations in one or more of a set of parameters of the touch;

determining a first confidence level based on the first reliability value and an activity context, wherein the activity context comprises a user pattern which comprises a consistency demonstrated by a user using a stylus to enter data in a window of an application;

determining that the first reliability value is less than a particular level, the first reliability value indicating a low probability that the first touch is intended;

determining that the first touch is a gesture specific to the application in response to determining that the first reliability level is less than the particular level; and transmitting an input related to the first touch to the application based on determining that the first touch is a gesture specific to the application.

16. The method of claim 15, wherein the method of claim 15 is repeated for a second touch.

17. The method of claim 16, wherein the second touch is being applied at substantially the same time as the first touch.

18. The method of claim 15, wherein the determining the confidence level for the touch further comprises, determining a variability of the reliability value over time.

19. The method of claim 1, further comprising delaying a determination related to rejecting the touch, wherein an amount of delay varies depending on the confidence level, a location of the touch, whether the application is expecting an input, or a combination thereof.

20. The method of claim 1, further comprising:
determining whether an area of the touch exceeds a predetermined limit; and
rejecting the touch when the area of the touch exceeds the predetermined limit.

* * * * *